United States Patent [19]

Rodrigues

[11] Patent Number: 5,536,311
[45] Date of Patent: Jul. 16, 1996

[54] SET RETARDED CEMENT COMPOSITIONS, ADDITIVES AND METHODS

[75] Inventor: Klein A. Rodrigues, Duncan, Okla.

[73] Assignee: Halliburton Company, Duncan, Okla.

[21] Appl. No.: 510,293

[22] Filed: Aug. 2, 1995

Related U.S. Application Data

[63] Continuation of Ser. No. 289,834, Aug. 12, 1994, abandoned, which is a continuation of Ser. No. 86,403, Jul. 1, 1993, abandoned, which is a continuation-in-part of Ser. No. 955,604, Oct. 2, 1992, abandoned.

[51] Int. Cl.$^6$ .......................... C04B 24/00; C04B 24/04; C04B 24/16

[52] U.S. Cl. .......................... 106/724; 106/725; 106/728; 106/802; 106/809; 106/810; 106/823; 166/285; 166/293; 166/294; 405/266; 524/2; 524/5; 524/650

[58] Field of Search .................... 106/724, 819, 106/823, 725, 728, 802, 809, 810; 166/285, 293, 294; 405/266; 524/2, 5, 4, 650

[56] References Cited

U.S. PATENT DOCUMENTS

| 4,555,269 | 11/1985 | Rao et al. ........................... | 166/293 |
| 4,557,763 | 12/1985 | George et al. ..................... | 166/293 |
| 4,674,574 | 6/1987 | Savoly et al. ..................... | 166/293 |
| 4,941,536 | 7/1990 | Brothers et al. .................. | 166/293 |

FOREIGN PATENT DOCUMENTS 91-237045 2/1990 Japan.

*Primary Examiner*—Mark L. Bell
*Assistant Examiner*—Michael Marcheschi
*Attorney, Agent, or Firm*—Craig W. Roddy; C. Clark Dougherty, Jr.

[57] ABSTRACT

The present invention provides set retarding additives, set retarded hydraulic cement compositions including such additives and methods of using the cement compositions for cementing zones in wells. The set retarding additives are copolymers or terpolymers containing monomer units formed from one of maleic acid, itaconic acid, fumaric acid, citraconic acid and mesaconic acid along with other monomer units.

11 Claims, No Drawings

SET RETARDED CEMENT COMPOSITIONS, ADDITIVES AND METHODS

CROSS REFERENCE TO RELATED APPLICATION

This is a continuation of application Ser. No. 80/289,834, filed Aug. 12, 1994, now abandoned, which is a continuation of application Ser. No. 08/086,403, filed Jul. 1, 1993, now abandoned, which is a continuation-in-part of application Ser. No. 07/955,604, filed Oct. 2, 1992, now abandoned.

BACKGROUND OF THE INVENTION

1. Field of the Invention

The present invention broadly relates to hydraulic cement compositions and methods of their use, and specifically, to additives for retarding the set of hydraulic cement compositions, set-retarded hydraulic cement compositions, and methods of using the compositions for cementing subterranean zones in wells.

2. Description of the Prior Art

In the construction and repair of wells, such as oil, gas and water wells, various operations featuring the use of hydraulic cement compositions are performed. For example, in the completion of a well comprised of a well bore which penetrates one or more subterranean formations, a pipe, such as casing, is disposed in the well bore and a hydraulic cement composition is placed in the annular space between the walls of the well bore and the exterior of the pipe. The cement composition is permitted to set in the annular space whereby a cement sheath is formed therein which bonds the pipe to the walls of the well bore and prevents the undesirable flow of fluids into and through the annular space. Formation of the cement sheath is referred to herein as primary cementing.

In repairing wells, hydraulic cement compositions are often utilized to plug holes or cracks in pipe disposed in the well bore; to plug holes, cracks, voids or channels in the aforementioned cement sheath; and to plug permeable zones or fractures in subterranean formations. Such holes, cracks, voids, channels, and permeable zones are plugged by squeezing hydraulic cement compositions therein which harden and form impermeable plugs. The above procedures are referred to herein as remedial cementing.

High temperatures are frequently encountered in deep subterranean zones. When cementing such zones, the combination of the depth of the zone and high temperatures encountered often results in the requirement that the setting time of the cement composition be extended. That is, the thickening and setting of the cement composition must be retarded or delayed for a time sufficient to permit the cement composition to be pumped into the zone to be cemented. Set retarding additives have been developed and used for this purpose, and such additives have been mixed with well cement compositions in amounts sufficient to delay the setting of the compositions to enable them to be pumped into desired subterranean locations.

While a variety of set retarding additives have been developed and used successfully, they can, and often do, produce erratic results in cement compositions of varying content and/or cause premature gelation of the cement compositions when they are subjected to high temperatures such as those encountered in deep subterranean zones. The high temperatures referred to herein are temperatures up to 250° F. and as high as 500° F. and beyond. Gelation, as used herein, means an increase in viscosity of a cement composition without an increase in compressive strength. Such gelation renders the cement composition difficult or impossible to pump even though the cement composition has not set. In addition, a number of prior art set retarding additives are synthetic polymers which are difficult to produce. Thus, there is a continuing need for improved cement set retarding additives which do not cause premature gelation and which are relatively easy to produce. There is a need for set retarded hydraulic cement compositions containing such additives and methods of using the compositions for conducting cementing operations in wells.

SUMMARY OF THE INVENTION

The present invention provides improved set retarding additives, improved set retarded hydraulic cement compositions and improved methods of using the compositions which meet the needs described above and overcome the shortcomings of the prior art.

The set retarding additives of this invention are copolymers and terpolymers, which, for convenience are referred to herein as polymers. The copolymers are formed from first and second monomer forming compounds, which are different compounds and the terpolymers, are formed from first, second and third monomer forming compounds which are different compounds.

The first monomer forming compound is selected from compounds having the structural formula:

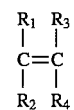

wherein: $R_1$ is H or $CH_3$; $R_2$ is H or COOH; $R_3$ is H or COOH; and $R_4$ is H, COOH or $CH_2COOH$; provided that when $R_1$ is H and $R_2$ is COOH, $R_3$ and $R_4$ are different and are either H or COOH; when $R_1$ and $R_2$ are both H, $R_3$ is COOH and $R_4$ is $CH_2COOH$; and when $R_1$ is $CH_3$, $R_2$ is COOH and $R_3$ and $R_4$ are different and are either H or COOH. Examples of the first monomer forming compounds are maleic acid, itaconic acid, fumaric acid, citraconic acid and mesaconic acid.

The second monomer forming compound is a compound selected from the group consisting of 2-acrylamido-2-methylpropane sulfonic acid, sodium methallyl sulfonate, sodium p-vinyl benzene sulfonate, acrylamide, N,N-dimethylacrylamide, vinyl sulfonic acid, acrylonitrile, 1-vinyl-2-pyrrolidone, vinyl phosphonic acid and selected cationic compounds. For purposes of this invention, a cationic compound is a compound containing an atom with a positive charge, wherein the atom is covalently bonded to other atoms of the compound. Of these, 2-acrylamido-2methylpropane sulfonic acid and sodium methallyl sulfonate are preferred for use as the second monomer forming compound.

The third monomer forming compound is a compound selected from the group consisting of maleic acid, acrylic acid and any of the second monomer forming compounds listed above. The third monomer forming compound is preferably acrylic acid. It is emphasized that in any given polymer of this invention, the compounds employed to produce the copolymer or terpolymer are different compounds.

When the set retarding polymer is formed of first and second monomer forming compounds, i.e., when the additive is a copolymer, the first monomer units are generally present in the copolymer in an amount in the range of from about 5 mole percent to about 50 mole percent of the copolymer and the second monomer units are present in the range of from about 95 to about 50 mole percent of the copolymer. When the additive is a terpolymer, the first monomer units are generally present in an amount in the range of from about 5 mole percent to about 50 mole percent of the terpolymer, the second monomer units are present in an amount in the range of from about 90 to about 45 mole percent of the terpolymer and the third monomer units are present in the range of from about 5 to about 50 mole percent of the terpolymer.

Set retarded hydraulic cement compositions including the additives of this invention and methods of using the cement compositions are also provided.

It is, therefore, an object of the present invention to provide improved set retarding additives, set retarded cement compositions, and methods of using the set retarded cement compositions in primary and in remedial cementing operations.

Other and further features, objects and advantages of the present invention will readily suggest themselves to those skilled in the art upon a reading of the following description of preferred embodiments.

DESCRIPTION OF PREFERRED EMBODIMENTS

The cement set retarding additives of this invention are relatively easily prepared; they are not known to cause premature gelation and permit the estimation of predictable cement composition thickening and setting times. The additives are copolymers and terpolymers all of which include first monomer units formed from monomer forming compounds selected from acids of the same basic structure represented by the formula:

(I)

wherein: $R_1$ is H or $CH_3$; $R_2$ is H or COOH; $R_3$ is H or COOH; and $R_4$ is H, COOH or $CH_2COOH$; provided that when $R_1$ is H and $R_2$ is COOH, $R_3$ and $R_4$ are different and are either H or COOH; when $R_1$ and $R_2$ are both H, $R_3$ is COOH and $R_4$ is $CH_2COOH$; and when $R_1$ is $CH_3$, $R_2$ is COOH and $R_3$ and $R_4$ are different and are either H or COOH. Examples of compounds within the scope of the above structure are maleic acid, itaconic acid, fumaric acid, citraconic acid, mesaconic acid and similar acids.

Maleic acid is represented by the above formula when $R_1$ and $R_3$ are hydrogen and $R_2$ and $R_4$ are carboxyl groups (COOH). In itaconic acid, $R_1$ and $R_2$ are hydrogen, $R_3$ is a carboxyl group and $R_4$ is a methylcarboxyl group ($CH_2COOH$). In fumaric acid, $R_1$ and $R_4$ are hydrogen and $R_2$ and $R_3$ are carboxyl groups. In citraconic acid, $R_1$ is a methyl group, $R_3$ is hydrogen and $R_2$ and $R_4$ are carboxyl groups. In mesaconic acid, $R_1$ is a methyl group, $R_4$ is hydrogen and $R_2$ and $R_3$ are carboxyl groups. When acids within the scope of the above structure are polymerized, they form monomer units in the produced polymer having the structure:

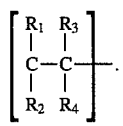
(II)

All of the additives also include second monomer units formed from compounds selected from the group consisting of 2-acrylamido-2-methylpropane sulfonic acid, sodium methallyl sulfonate, sodium-p-sulfophenyl methallyl ether, sodium p-vinyl benzene sulfonate, acrylamide, N,N-dimethylacrylamide, vinyl sulfonic acid, acrylonitrile, 1-vinyl-2-pyrrolidone, vinyl phosphonic acid, diallydimethylammonium chloride, and water soluble acrylates, methacrylates, acrylamide derivatives, and cationic monomers, such as dimethylaminoethyl methacrylatemethylchloride, diethylaminoethyl methacrylate, dimethyl aminoethyl acrylate methyl chloride, N-dimethyl aminopropyl methacrylamide, methacrylamido propyltrimethyl ammonium chloride, N,N-dimethylaminoethyl methacrylate and 2-triethylammoniummethyl methacrylate chloride and the like.

When the second monomer forming compound is acrylamide, the polymer can be modified by reacting the acrylamide groups of the polymer with formaldehyde and sodium sulfite to thereby sulfomethylate a part of the polymer. During the sulfomethylation reaction, a part of the unsulfomethylated acrylamide groups may be hydrolyzed to carboxylic groups which aid in the retardation properties of the copolymer. The sulfomethylation of some of the acrylamide groups in the polymer renders them resistant to hydrolysis when the polymer is added to a hydraulic cement composition whereby they contribute to the compressive strength development of the cement. Of the second monomer forming compounds, 2-acrylamido-2-methylpropane sulfonic acid and sodium methallyl sulfonate are preferred for use as second monomers. The second monomer units formed from 2-acrylamido-2-methylpropane sulfonic acid have the following structure:

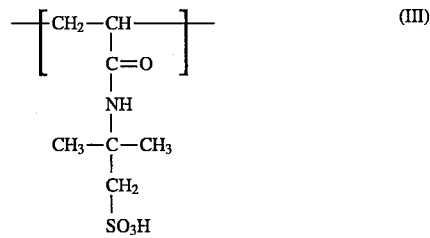
(III)

The second monomer units formed from sodium methallyl sulfonate have the following structure:

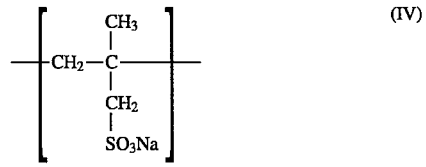
(IV)

When the polymer additive of this invention is a copolymer, the first monomer units are preferably formed from one of maleic acid and itaconic acid and the second monomer unit is preferably formed from 2-acrylamido-2-methylpropane sulfonic acid.

The copolymers generally include monomer units formed from the first monomer unit in an amount in the range of from about 5 mole percent to about 50 mole percent with the remainder comprising monomer units formed from the second monomer unit. More preferably, first monomer units are present in the copolymer in an amount in the range of from about 30 mole percent to about 50 mole percent with the remainder comprising second monomer units. The most preferred copolymer set retarding additive of this invention consists essentially of monomer units formed from maleic acid and 2-acrylamido, 2-methylpropane sulfonic acid in a mole ratio, respectively, of about 43.4 to 56.6.

When the polymer set retarding additive of this invention is a terpolymer, it includes monomer units formed from the above described first and second monomer forming compounds and monomer units formed from a third compound. The third compound can be maleic acid, acrylic acid or any one of the second monomer forming compounds listed above. As previously stated, the first, second and third monomer forming compounds must be different in order to form copolymers and terpolymers having two or three different monomer units therein, respectively. Of the third monomer forming compounds that can be used to produce the terpolymers, maleic acid, acrylic acid and acrylamide are preferred with acrylic acid being the most preferred. The monomer units formed from acrylic acid and acrylamide have the following structural formulas, respectively:

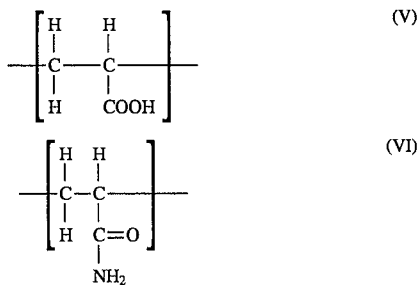

When the terpolymers contain acrylamide, they can be sulfomethylated using formaldehyde and sodium sulfite as described above.

Generally, monomer units formed from the first monomer forming compound are present in the terpolymer in an amount in the range of from about 5 mole percent to about 50 mole percent; monomer units formed from the second monomer forming compound are present in an amount in the range of from about 90 mole percent to about 45 mole percent; and monomer units formed from the third monomer forming compound are present in the terpolymer in an amount in the range of from about 5 to about 50 mole percent.

Preferred terpolymer set retarding additives of this invention are terpolymers consisting essentially of monomer units formed from a first compound selected from one of maleic acid and the other first monomer forming compound described above, monomer units formed from a second compound selected from one of 2-acrylamido-2-methylpropane sulfonic acid and sodium methallyl sulfonate, and monomer units formed from a third monomer forming compound selected from one of acrylic acid and maleic acid when the first monomer forming compound is not maleic acid. A particularly preferred terpolymer consists essentially of monomer units formed from maleic acid, 2-acrylamido, 2-methylpropane sulfonic acid and acrylic acid in a mole ratio, respectively, of 33.0 to 36.5 to 30.4. The most preferred terpolymer consists of monomer units formed from itaconic acid, 2-acrylamido, 2-methylpropane sulfonic acid and maleic acid in a mole ratio, respectively, of about 24.5 to 67.0 to 8.5.

To make the above described polymers, the monomers can be polymerized in an aqueous solution using sodium persulfate and tetraethylenepentamine as an initiating system. In a typical synthesis, all the compounds to be polymerized are dissolved in deionized water and the solution (i.e., the reaction mixture) is maintained in a water bath at 60° C. Nitrogen is bubbled through the reaction mixture for a minimum time of 30 minutes to eliminate any dissolved oxygen and then small quantities of sodium persulfate and tetraethylenepentamine are added to the reaction mixture. The reaction is allowed to proceed for about 4 hours. The aqueous solution containing produced polymer can be utilized directly as a liquid cement composition set retarding additive.

The set retarded hydraulic cement compositions of this invention are comprised of a hydraulic cement, sufficient water to form a slurry of the cement and the polymer set retarding additive described above. While various hydraulic cements can be utilized in the cement compositions, Portland cement is generally preferred, and can be, for example, one or more of the various types identified as API Classes A–H and J cements. These cements are classified and defined in *API Specification for Materials and Testing for Well Cements*, API Specification 10A, 21st Edition dated Sep. 1, 1991, of the American Petroleum Institute, Washington, D.C. API Portland cements generally have a maximum particle size of about 90 microns and a specific surface (sometimes referred to as Blaine Fineness) of about 3900 square centimeters per gram. A useful and effective cement slurry for use in accordance with this invention comprises API Class H Portland cement mixed with water to provide a density of from about 11.3 to about 18.0 pounds per gallon.

It is often advantageous to use a small particle size hydraulic cement consisting of particles having diameters no larger than about 30 microns and having a Blaine Fineness of no less than about 6000 square centimeters per gram. Preferably, the cement particles have diameters no larger than about 17 microns and most preferably no larger than about 11 microns. The Blaine Fineness is preferably greater than about 7000 square centimeters per gram, more preferably greater than about 10,000 square centimeters per gram and still more preferably greater than about 13,000 square centimeters per gram. Methods of utilizing such small particle size hydraulic cement in primary and remedial cementing are disclosed in U.S. Pat. Nos. 5,121,795 issued Jun. 16, 1992 and 5,125,455 issued Jun. 30, 1992.

The water used in the cement compositions can be water from any source, provided that the water does not contain an excess of compounds which adversely react with or otherwise affect other components in the cement compositions. The water is present in the cement composition of this invention in an amount sufficient to form a slurry of the cement, preferably, a slurry which is readily pumpable. The expression pumpable as used herein means, generally, the water is present in the range of from about 30 percent to about 60 percent by weight of dry cement in the composition when the cement is of normal particle size. When a cement of small particle size as described above is used, water is present in the cement composition in an amount in the range of from about 100 percent to about 200 percent by weight of dry cement in the composition. A dispersing agent, such as the dispersing agent described in U.S. Pat. No. 4,557,763 issued on Dec. 10, 1985, is generally included to facilitate the formation of the cement slurry and prevent the premature gelation thereof.

When cement compositions are utilized to conduct primary, remedial and other cementing operations in subterranean zones penetrated by well bores, the compositions must remain pumpable for a sufficient period of time to permit the placement of them in the subterranean zones to be cemented. The set retarding additive described above is, accordingly, included in the cement composition of this invention in an amount sufficient to delay or retard the setting of the composition for the time period required to place the composition in a desired location. The thickening and set times of cement compositions are strongly dependent upon temperature and pressure, and to obtain satisfactory results in well cementing applications, a quantity of the polymer set retarding additive of this invention required to provide the necessary pumping time at the temperature and pressure to be encountered is included in the cement composition to be utilized. Such quantity can be determined in advance by performing thickening time tests of the type described in the above mentioned API Specification 10. Generally, an aqueous solution of one of the above described set retarding polymer additives which contains about 25 percent polymer by weight of solution, i.e., 25% active, is combined with a cement slurry in an amount whereby the active polymer is present in the resulting set retarded cement composition in an amount in the range of from about 0.1% to about 6% by weight of dry cement in the composition.

A variety of other additives can be included in the well cement compositions of this invention in addition to the polymer set retarding additives disclosed herein. Such other additives are well known to those skilled in the art and can be included in well cement compositions to vary the density and compressive strength, and to control fluid loss, reduce viscosity, increase resistance to corrosive fluids, and the like. Essentially, a cement composition meeting the specifications of the American Petroleum Institute is mixed with water and other additives to provide a cement slurry appropriate for the conditions existing in each individual well to be cemented.

A particularly preferred set retarded cement composition of this invention is comprised of hydraulic cement, water in an amount in the range of from about 30 percent to about 60 percent by weight of dry cement in the composition and active copolymer set retarding additive present in the composition in an amount in the range of from about 0.1 percent to about 6.0 percent by weight of dry cement therein. The set retarding additive consists essentially of a polymer containing monomer units formed from a first monomer forming compound and a second monomer forming compound. The first monomer forming compound is selected from compounds represented by the structural formula:

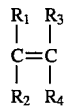

wherein: $R_1$ is H or $CH_3$, $R_2$ is H or COOH, $R_3$ is H or COOH, and $R_4$ is H, COOH or $CH_2COOH$; provided that when $R_1$ is H and $R_2$ is COOH, $R_3$ and $R_4$ are different and are either H or COOH; when $R_1$ and $R_2$ are both H, $R_3$ is COOH and $R_4$ is $CH_2COOH$; and when $R_1$ is $CH_3$, $R_2$ is COOH and $R_3$ and $R_4$ are different and are either H or COOH. The second monomer forming compound is selected from the group consisting of 2-acrylamido-2-methylpropane sulfonic acid, sodium methallyl sulfonate, sodium p-vinyl benzene sulfonate, acrylamide, N,N-dimethylacrylamide, vinyl sulfonic acid, acrylonitrile, 1-vinyl-2-pyrrolidone, vinyl phosphonic acid, diallydimethylammonium chloride, dimethylaminoethyl methacrylatemethylchloride, diethylaminoethyl methacrylate, dimethylaminoethyl acrylate methyl chloride, methacrylamido propyltrimethyl ammonium chloride, N,N-dimethylaminoethyl methacrylate, 2-triethylammoniummethyl methacrylate chloride and the like. When the second monomer forming compound is acrylamide, the copolymer can be sulfomethylated to introduce sulfomethyl groupings into the copolymer as described above. Of the foregoing compounds, 2-acrylamido-2-methylpropane sulfonic acid and sodium methallyl sulfonate are preferred.

The methods of this invention for cementing a subterranean zone penetrated by a well bore are comprised of the steps of forming a pumpable, set retarded cement composition of this invention, pumping the cement composition into the subterranean zone by way of the well bore, and then allowing the cement composition to set therein.

The following examples are provided in order to further describe the additives, compositions and methods of this invention and to facilitate a clear understanding thereof.

EXAMPLE 1

Maleic acid and 2-acrylamido-2-methylpropane sulfonic acid were copolymerized in an aqueous solution using sodium persulfate and tetraethylenepentamine as the initiating system. In this regard, 3 grams of maleic acid and 7 grams of 2-acrylamido-2-methylpropane sulfonic acid were dissolved in 100 grams of deionized water. The resulting solution (reaction mixture) was placed in a water bath maintained at 60° C. Nitrogen was bubbled through the reaction mixture for 30 minutes to eliminate any dissolved oxygen and then 0.2 grams of sodium persulfate and 0.25 milliliters of tetraethylenepentamine were added to the reaction mixture and the reaction was allowed to proceed for about 4 hours. The resulting reaction product mixture was an aqueous solution of a copolymer comprised of monomer units formed from maleic acid and 2-acrylamido-2-methylpropane sulfonic acid in a mole ratio, respectively, of about 43.4 to 56.6. It is believed that the solution contained about 9% by weight of the described copolymer.

EXAMPLE 2

Various quantities of the set retarding polymer additive produced as described in Example 1 above were added to test portions of a base cement slurry. The base cement slurry was comprised of Lone Star Class H hydraulic cement and water in an amount of 38 percent by weight of dry cement. The base slurry had a density of 16.4 pounds per gallon. The cement composition samples were tested at temperatures above 200° F. and therefore also contained silica flour in an amount of 35 percent by weight of dry cement to prevent the loss of set cement compressive strength over time at high temperatures.

The test cement composition samples, containing various quantities of the set retarding additive, were tested for thickening times at various temperatures in accordance with the standard API thickening time testing procedures set forth in the API Specification 10 referred to above. The results of these tests are set forth in Table I below.

TABLE I

Thickening Times Of Set Retarded Cement Compositions

| Amount of Set Retarding Additive in Cement Composition[1], by Weight of Dry Cement | Thickening Times, hr:min | | | | | |
|---|---|---|---|---|---|---|
| | 145° F. | 170° F. | 200° F. | 250° F. | 275° F. | 300° F. |
| 0.2 | 2:50 | 2:50 | 2:20 | — | — | — |
| 0.3 | 6:04 | 5:25 | 4:55 | — | — | — |
| 0.4 | 6:09 | 7:50 | 7:06 | — | — | — |
| 0.5 | 8:56 | 11:00 | 10:39 | 2:58 | — | — |

TABLE I-continued

Thickening Times Of Set Retarded Cement Compositions

| Amount of Set Retarding Additive in Cement Composition[1], by Weight of Dry Cement | Thickening Times, hr:min | | | | | |
|---|---|---|---|---|---|---|
| | 145° F. | 170° F. | 200° F. | 250° F. | 275° F. | 300° F. |
| 0.75 | — | — | — | 4:50 | 2:23 | — |
| 1.0 | — | — | — | 7:04 | 2:44 | 1:45 |
| 1.5 | — | — | — | — | 3:15 | 2:05 |

[1]Lonestar Class H cement, 38% water by weight of dry cement and set retarding additive (16.4 lb/gal). Silica flour was included in the test compositions in tests over 200° F. in amounts of 35% by weight of dry cement.

50% and 75% of the total times prior to thickening. The results of these tests are given in Table II below.

TABLE II

Gelation of Set Retarded Cement Compositions

| Set Retarding Additive in Cement Composition[1] | Amount, % by Weight of Dry Cement | Thickening Time, hr:min | | Initial Viscosity, cp | Viscosity at 25% of Thickening Time, cp | Viscosity at 50% of Thickening Time, cp | Viscosity at 75% of Thickening Time, cp |
|---|---|---|---|---|---|---|---|
| | | 200° F. | 250° F. | | | | |
| Copolymer of this Invention | 0.3 | 4:55 | — | 10 | 10 | 10 | 11 |
| Prior Art Retarder | 0.3 | 2:55 | — | 9 | 30 | 32 | 36 |
| Copolymer of this Invention | 0.5 | 10:39 | — | 8 | 6 | 5 | 6 |
| Prior Art Retarder | 0.5 | 4:45 | — | 14 | 25 | 46 | 52 |
| Copolymer of this Invention | 0.75 | — | 4:50 | 16 | 17 | 17 | 17 |
| Prior Art Retarder | 0.75 | — | 3:10 | 22 | 18 | 38 | 55 |

[1]Cement composition was Lonestar Class H cement, 38% water by weight of dry cement and set retarding additive (16.4 lb/gal). Silica flour was included in the test compositions in the tests over 200° F. in amounts of 35% by weight of dry cement.

From Table I it can be seen that the set retarding copolymer additive of this invention produced excellent thickening times at small concentrations at temperatures up to and including 300° F. Also, the thickening time increased as the concentration of the additive was increased.

It should be noted that the quantity of additive disclosed in Table I, above, and in all of the tables below, where quantities are specified, denotes the quantity of "active" material.

EXAMPLE 3

The copolymer set retarding additive prepared as described in Example 1 was tested to determine if it causes gelation; it was compared with a prior art set retarder comprised of a copolymer of acrylic acid and 2-acrylamido-2-methylpropane sulfonic acid. The prior art copolymer and its use as a set retarding additive are described in U.S. Pat. No. 4,941,536 issued Mar. 5, 1991.

The two set retarding additives tested were added to samples of the base slurry described in Example 2 in varying amounts. The gelation tests consisted of API thickening time tests at 200° F. and 250° F. in which the viscosities of the test cement compositions were determined initially and at 25%, From Table II it can be seen that the prior art set retarder causes gelation since the viscosity values increase during the time prior to thickening. The polymer set retarding additive of this invention, on the other hand, does not cause gelation as shown by the viscosity readings remaining constant during the time prior to thickening. Further, the results set forth in Table II show that the copolymer set retarding additive of this invention produced considerably longer pump times than were obtained with the same amount of prior art additive.

As mentioned, the set retarding additive of this invention produced no gelation, i.e., the viscosities remained relatively constant, and the cement compositions containing the additive of this invention had right angle sets. The term "right angle set" is used herein to mean that the slurry goes directly from a relatively low viscosity slurry to a set cement having compressive strength without experiencing a substantial viscosity increase prior to set.

EXAMPLE 4

The set retarding additive prepared in accordance with Example 1 was added in various quantities to the base cement slurry described in Example 2 along with small quantities of a suspending agent. The resulting cement composition samples were tested for 24 hour compressive strengths at various temperatures in accordance with API Specification 10. The prior art set retarding additive described in Example 3 was also tested in the same manner as the set retarding additive of the present invention. The results of these tests are set forth in Table III below.

TABLE III

Compressive Strengths of Set Retarded Cement Compositions

| Set Retarding Additive in Cement Composition[1] | Amount, % by Weight of Dry Cement | Compressive Strengths, psi | | | | |
|---|---|---|---|---|---|---|
| | | 170° F. | 200° F. | 225° F. | 250° F. | 300° F. |
| Copolymer of this Invention | 0.3 | 3180 | 3780 | — | — | — |
| Prior Art Retarder | 0.3 | — | 3730 | — | — | — |
| Copolymer of this Invention | 0.5 | — | — | — | 3142 | — |
| Prior Art Retarder | 0.5 | — | — | 4580 | — | — |
| Copolymer of this Invention | 1.5 | — | — | — | — | 2470 |
| Prior Art Retarder | 1.5 | — | — | — | 5130 | 2370 |

[1]Cement composition was Lonestar Class H cement, 38% water by weight of dry cement, borate treated hydroxypropylguar in an amount of 0.1% by weight of dry cement and set retarding additive (16.4 lb/gal). Silica flour was included in the test compositions in the tests over 200° F. in an amount of 35% by weight of dry cement.

As can be seen from Table III, the compressive strengths of the cement compositions of this invention are excellent and are in the same range as those achieved by the cement compositions containing the prior art set retarding additive.

EXAMPLE 5

A terpolymer set retarding additive of the present invention was prepared as follows. 3.4 grams of itaconic acid, 16.6 grams of 2-acrylamido-2-methylpropane sulfonic acid and 1 gram of maleic anhydride were dissolved in 60 grams of deionized water. The solution was deaerated with nitrogen and placed in a water bath maintained at 60° C. The nitrogen was bubbled through the solution (reaction mixture) for at least 30 minutes followed by the addition to the reaction mixture of 0.4 gram of sodium persulfate and 0.7 milliliter of tetraethylenepentamine. The reaction was allowed to proceed for 4 hours to produce an aqueous reaction solution believed to contain about 25.9% by weight terpolymer product. The terpolymer product was comprised of monomer units formed from itaconic acid, 2-acrylamido-2-methylpropane sulfonic acid and maleic acid in a mole ratio, respectively, of 24.5 to 67.0 to 8.5.

EXAMPLE 6

Various quantities of the terpolymer set retarding additive produced as described in Example 5 above (a 25.9% by weight aqueous solution of the terpolymer) were added to test samples of a base cement slurry. The base cement slurry was comprised of Lonestar Class H cement, silica flour in an amount of 35% by weight of dry cement and water in an amount of 38% by weight of dry cement. The base slurry had a density of 17.2 pounds per gallon.

The test cement composition samples containing various quantities of the terpolymer set retarding additive were tested for thickening times at various temperatures in accordance with the standard API thickening time testing procedures set forth in API Specification 10. The results of these tests are given in Table IV below.

TABLE IV

Thickening Times of Set Retarded Cement Compositions

| Amount of Set Retarding Additive in Cement Composition[1], % by Weight of Dry Cement | Thickening Times, hr:min | | | | | | |
|---|---|---|---|---|---|---|---|
| | 200° F. | 250° F. | 300° F. | 350° F. | 400° F. | 450° F. | 500° F. |
| 0.3 | 7:48 | 2:45 | — | — | — | — | — |
| 0.5 | — | 5:35 | 2:20 | — | — | — | — |
| 0.75 | — | 7:24 | 3:32 | — | — | — | — |
| 0.9 | — | — | 4:22 | 1:52 | — | — | — |
| 1.3 | — | — | — | 4:20 | — | — | — |
| 1.5 | — | — | — | — | 1:53 | — | — |
| 2.2 | — | — | — | — | 3:16 | — | — |
| 2.5 | — | — | — | — | — | 4:04 | — |
| 3.3 | — | — | — | — | — | 7:30 | — |
| 4.0 | — | — | — | — | — | 9:00+ | 4:11 |

[1]Lonestar Class H cement, 35% silica flour by weight of dry cement, 38% water by weight of dry cement and set retarding additive (17.2 lb/gal).

From Table IV above it can be seen that the terpolymer formed from itaconic acid, 2-acrylamido-2-methylpropane sulfonic acid and maleic acid (maleic anhydride) is an excellent high temperature retarder which can be utilized in the temperature range of from about 200° F. to about 500° F. and above. In addition, no gelation was exhibited by any of the test cement composition samples tested for thickening time.

EXAMPLE 7

Various quantities of the terpolymer made in Example 5, were added to test samples of the base cement slurry described in Example 6 above. The samples containing the terpolymer were tested to determine 24 hour compressive strengths at various temperatures in accordance with API Specification 10. The results of these tests are set forth in Table V below.

TABLE V

Compressive Strengths of Set Retarded Cement Compositions

| Set Retarding Additive in Cement Composition[1] | Amount, % by Weight of Dry Cement | Compressive Strengths, psi | |
|---|---|---|---|
| | | 300° F. | 350° F. |
| Terpolymer of this Invention | 0.5 | 2580 | 3920 |
| Terpolymer of this Invention | 0.75 | 2830 | 3360 |

[1]Cement composition was Lonestar Class H cement, 35% silica flour by weight of dry cement, 38% water by weight of dry cement and set retarding additive (17.2 lb/gal).

From Table V it can be seen that cement compositions containing the terpolymer set retarding additive have excellent compressive strength development at the test temperatures.

EXAMPLE 8

A copolymer set retarding additive was prepared as follows. 6 grams of itaconic acid and 14 grams of 2-acrylamido-2-methylpropane sulfonic acid (AMPS) were dissolved in 60 grams of deionized water. The mole ratio of AMPS to itaconic acid was about 59.4 to 40.6. The solution was purged with nitrogen, placed in a 60° C. water bath and 0.4 gram of sodium persulfate and 0.7 ml of tetraethylenepentamine were added. The ensuing reaction was allowed to proceed for 4 hours to produce an aqueous reaction solution containing a copolymer product comprised of itaconic acid and 2-acrylamido-2-methylpropane sulfonic acid. The aqueous copolymer solution was added in various quantities to test samples of a base cement slurry containing small particle size cement. That is, the base slurry was comprised of a Portland hydraulic cement having a particle size not greater than about 30 microns and a Blaine Fineness no less than about 6,000 square centimeters per gram, a dispersant described in U.S. Pat. No. 4,557,763 comprised of a polymeric additive prepared by the caustic-catalyzed condensation of formaldehyde, acetone and sodium sulfite in an amount of 1% by weight of dry cement and water in an amount of 100% by weight of dry cement. The base slurry had a density of 12.5 pounds per gallon. The test cement composition samples were tested for thickening times at various temperatures in accordance with the procedure set forth in API Specification 10. The results of these tests are set forth in Table VI below.

TABLE VI

Thickening Times of Set Retarded Small Particle Size Cement Compositions

| Amount of Set Retarding Additive in Cement Composition[1], % by Weight of Dry Cement | Thickening Times, hr:min | |
|---|---|---|
| | 140° F. | 187° F. |
| 0.5 | 1:04 | — |
| 1.0 | 17:14 | 3:10 |
| 1.25 | — | 6:10 |
| 1.5 | — | 7:02 |

[1]Small Particle Size Portland Cement, 1% Sulfonated Acetone-Formaldehyde Condensate (USPN 4,557,763) by weight of dry cement, 100% water by weight of dry cement and set retarding additive (12.5 lb/gal).

From Table VI it can be seen that the copolymer set retarding additive tested is an excellent set retarder in small particle size cement slurries.

EXAMPLE 9

A copolymer set retarding additive was prepared as follows. 5 grams of maleic anhydride and 10 grams of sodium methallyl sulfonate were dissolved in 50 grams of deionized water. The mixture was purged with nitrogen, placed in a 90° C. water bath and 1 gram of potassium persulfate was added thereto. The reaction was allowed to proceed for 4 hours, to form a copolymer product containing maleic acid and methallyl sulfonate.

Various quantities of the above set retarding copolymer were added to test portions of the base cement slurry described in Example 2.

The test cement composition samples containing various quantities of the additive were tested for thickening times at various temperatures in accordance with API procedures. The results of these tests are set forth in Table VII below.

TABLE VII

Thickening Times of Set Retarded Cement Compositions

| Amount of Set Retarding Additive in Cement Composition[1], % by Weight of Dry Cement | Thickening Times[2], hr:min | | | |
|---|---|---|---|---|
| | 145° F. | 200° F. | 250° F. | 300° F. |
| 0.2 | 3:12 | 2:37 | — | — |
| 0.3 | 4:33 | 4:22 | — | — |
| 0.5 | 9:35 | 6:08 | — | — |
| 1.0 | — | — | 3:25 | — |
| 2.5 | — | — | — | 2:03 |

[1]Lonestar Class H Cement, 38% water by weight of dry cement and set retarding additive (16.4 lb/gal). Silica flour was included in the test compositions in tests over 200° F. in amounts of 35% by weight of dry cement.

A copolymer formed from itaconic acid and sodium methallyl sulfonate was also prepared having the same mole ratio and concentration in an aqueous solution as the above described copolymer formed from maleic acid and sodium methallyl sulfonate. The itaconic acid-sodium methallyl sulfonate copolymer was tested for thickening time at 200° F. in a sample of the same cement slurry as described above at a concentration of 0.5% by weight of dry cement. The thickening time was 4 hrs 13 min.

The above test results show that the polymer set retarding additives tested produce predictable thickening times without gelation.

EXAMPLE 10

The maleic acid terpolymer cement retarding additives described in Table VIII below were synthesized as follows. 1.5 grams of maleic anhydride, 3.5 grams of 2-acrylamido-2-methylpropane sulfonic acid and 1 gram of the third compound were dissolved in 50 grams of deionized water. The mixture solution was purged with nitrogen, placed in a 60° C. water bath and 0.1 gram of sodium persulfate and 0.1 ml of tetraethylenepentamine were added thereto. The reaction mixture was reacted for 4 hours which produced an aqueous solution of the reaction product of maleic acid, 2-acrylamido-2-methylpropane sulfonic acid and the third compound utilized.

The itaconic acid terpolymers described in Table VIII were produced by adding 0.8 gram of itaconic acid, 4.2 grams of 2-acrylamido-2-methylpropane sulfonic acid and 1 gram of the third compound to 50 grams of deionized water. The mixture was purged with nitrogen, placed in a 60° C. water bath and 0.1 gram of sodium persulfate and 0.2 ml of tetraethylenepentamine were added thereto. The reaction mixture was reacted for 4 hours which produced an aqueous solution of the reaction product of itaconic acid, 2-acrylamido-2-methylpropane sulfonic acid and the third compound.

TABLE VIII

| Terpolymer Number | Monomers Used | | | Reactant Mole Ratio |
|---|---|---|---|---|
| | First Compound | Second Compound | Third Compound | |
| 1 | Maleic Acid | 2-acrylamido-2-methyl-propane sulfonic acid | acrylic acid | 33.0 to 36.5 to 30.4 |
| 2 | Maleic Acid | 2-acrylamido-2-methyl-propane sulfonic acid | vinyl acetate | 34.9 to 38.6 to 26.5 |
| 3 | Maleic Acid | 2-acrylamido-2-methyl-propane sulfonic acid | acrylamide | 33.0 to 36.5 to 30.4 |
| 4 | Itaconic Acid | 2-acrylamido-2-methyl-propane sulfonic acid | acrylic acid | 15.3 to 50.3 to 34.4 |
| 5 | Itaconic Acid | 2-acrylamido-2-methyl-propane sulfonic acid | vinyl acetate | 16.2 to 53.3 to 30.5 |
| 6 | Itaconic Acid | 2-acrylamido-2-methyl-propane sulfonic acid | acrylamide | 15.3 to 50.3 to 34.4 |

Various quantities of the above terpolymer set retarding additives were added to test samples of the base cement slurry described in Example 6, and the test cement compositions produced were tested for thickening times in accordance with the API testing procedure. The results of these tests are set forth in Table IX below.

TABLE IX

Thickening Times of Set Retarded Cement Compositions

| Terpolymer Number | Amount of Set Retarding Additive in Cement Composition[1], % by Weight of Dry Cement | Thickening Times[2], hr:min | |
|---|---|---|---|
| | | 200° F. | 250° F. |
| 1 | 0.4 | 8:50 | — |
| 2 | 0.4 | 5:35 | — |
| 3 | 0.5 | 6:16 | — |
| 4 | 0.5 | — | 5:35 |
| 5 | 0.5 | — | 2:24 |
| 6 | 0.5 | — | 3:38 |

[1]Lonestar Class H cement, 38% water by weight of dry cement and set retarding additive (17.2 lb/gal). 35% silica flour by weight of dry cement was added to the cement compositions tested at 250° F.
[2]No gelation took place during tests.

The above test results show that the set retarding additives of this invention produce excellent thickening times in small quantities without gelation.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An additive for retarding the set of a hydraulic cement composition, said additive consisting essentially of a copolymer containing monomer units formed from a first monomer forming compound and a second monomer forming compound which are different wherein said monomer units are present in amounts in the range of from about 5 to about 50 and 95 to about 50 mole percent of said copolymer, respectively, and wherein said first monomer forming compound is selected from the group consisting of compounds represented by the structural formula

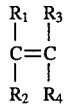

wherein $R_1$ is H or $CH_3$; $R_2$ is H or COOH; $R_3$ is H or COOH; and $R_4$ is H, COOH or $CH_2COOH$; provided that when $R_1$ is H and $R_2$ is COOH, $R_3$ and $R_4$ are different and are either H or COOH; when $R_1$ and $R_2$ are both H, $R_3$ is COOH and $R_4$ is $CH_2COOH$; and when $R_1$ is $CH_3$, $R_2$ is COOH and $R_3$ and $R_4$ are different and are either H or COOH; and said second monomer forming compound is selected from the group consisting of 2-acrylamido-2-methylpropane sulfonic acid, sodium methallyl sulfonate, sodium p-vinyl benzene sulfonate, acrylamide, N,N-dimethylacrylamide, vinyl sulfonic acid, acrylonitrile, 1-vinyl-2-pyrrolidone, vinyl phosphonic acid, diallydimethylammonium chloride, diethylaminoethyl methacrylate, dimethylaminoethyl acrylate methyl chloride, methacrylamido propyltrimethyl ammonium chloride, N,N-dimethylaminoethyl methacrylate, and 2-triethylammoniummethyl methacrylate chloride.

2. An additive for retarding the set of a hydraulic cement composition, said additive consisting essentially of a copolymer containing monomer units formed from a first monomer forming compound and a second monomer forming compound which are different wherein said monomer units are present in said copolymer in amounts in the range of from about 5 to about 50 and 95 to about 50 mole percent of said copolymer, repectively, and wherein said first monomer forming compound is selected from the group consisting of compounds represented by the structural formula

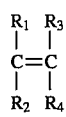

wherein $R_1$ is H or $CH_3$; $R_2$ is H or COOH; $R_3$ is H or COOH; and $R_4$ is H, COOH or $CH_2COOH$; provided that when $R_1$ is H and $R_2$ is COOH, $R_3$ and $R_4$ are different and are either H or COOH; when $R_1$ and $R_2$ are both H, $R_3$ is COOH and $R_4$ is $CH_2COOH$; and when $R_1$ is $CH_3$, $R_2$ is COOH and $R_3$ and $R_4$ are different and are either H or COOH; and said second monomer forming forming compound is acrylamide and the acrylamide groups in the polymer are reacted with formaldehyde and sodium sulfite.

3. The additive of claim 1 wherein said first monomer forming compound is selected from the group consisting of maleic acid and itaconic acid.

4. The additive of claim 3 wherein said second monomer forming compound is 2-acrylomido-2-methylpropane sulfonic acid.

5. A set retarded hydraulic cement composition comprised of:

hydraulic cement;

sufficient water to form a slurry; and a set retarding additive consisting essentially of a copolymer containing monomer units formed from a first monomer forming compound and a second monomer forming compound which are different and wherein said monomer units are present in amounts in the range of from about 5 to about 50 and 95 to about 50 mole percent of said copolymer, respectively, and wherein said first monomer forming compound is selected from the group consisting of compounds represented by the structural formula

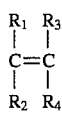

wherein $R_1$ is H or $CH_3$; $R_2$ is H or COOH; $R_3$ is H or COOH; and $R_4$ is H, COOH or $CH_2COOH$; provided that when $R_1$ is H and $R_2$ is COOH, $R_3$ and $R_4$ are different and are either H or COOH; when $R_1$ and $R_2$ are both H, $R_3$ is COOH and $R_4$ is $CH_2COOH$; and when $R_1$ is $CH_3$, $R_2$ is COOH and $R_3$ and $R_4$ are different and are either H or COOH; and said second monomer forming compound is selected from the group consisting of 2-acrylamido-2-methylpropane sulfonic acid, sodium methallyl sulfonate, sodium p-vinyl benzene sulfonate, acrylamide, N,N-dimethylacrylamide, vinyl sulfonic acid, acrylonitrile, 1-vinyl-2-pyrrolidone, vinyl phosphonic acid, diallydimethylammonium chloride, diethylaminoethyl methacrylate, dimethylaminoethyl acrylate methyl chloride, methacrylamido propyltrimethyl ammonium chloride, N,N-dimethylaminoethyl methacrylate, and 2-triethylammoniummethyl methacrylate chloride.

6. A set retarded hydraulic cement composition comprised of:

hydraulic cement;

sufficient water to form a slurry; and a set retarding additive consisting essentially of a copolymer containing monomer units formed from a first monomer forming compound and a second monomer forming compound which are different and wherein said monomer units are present in said copolymer in amounts in the range of from about 5 to about 50 and 95 to about 50 mole percent of said copolymer, respectively, and wherein said first monomer forming compound is selected from the group consisting of compounds represented by the structural formula

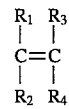

wherein $R_1$ is H or $CH_3$; $R_2$ is H or COOH; $R_3$ is H or COOH; and $R_4$ is H, COOH or $CH_2COOH$; provided that when $R_1$ is H and $R_2$ is COOH, $R_3$ and $R_4$ are different and are either H or COOH; when $R_1$ and $R_2$ are both H, $R_3$ is COOH and $R_4$ is $CH_2COOH$; and when $R_1$ is $CH_3$, $R_2$ is COOH and $R_3$ and $R_4$ are different and are either H or COOH; and said second monomer forming compound is acrylamide and the acrylamide groups in the polymer are reacted with formaldehyde and sodium sulfite.

7. The composition of claim 5 wherein said first monomer forming compound is selected from the group consisting of maleic acid and itaconic acid.

8. The composition of claim 7 wherein said second monomer forming compound is 2-acrylamido-2-methylpropane sulfonic acid.

9. A method of cementing a subterranean zone penetrated by a well bore comprising the steps of:

forming a pumpable set retarded cement composition comprised of hydraulic cement, sufficient water to form a pumpable slurry and a set retarding additive consisting essentially of a copolymer containing monomer units formed from a first monomer forming compound and a second monomer forming compound which are different and wherein said monomer units are present in amounts in the range of from about 5 to about 50 and 95 to about 50 mole percent of said copolymer, respectively, and wherein said first monomer forming compound is selected from the group consisting of compounds represented by the structural formula

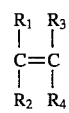

wherein $R_1$ is H or $CH_3$; $R_2$ is H or COOH; $R_3$ is H or COOH; and $R_4$ is H, COOH or $CH_2COOH$; provided that when $R_1$ is H and $R_2$ is COOH, $R_3$ and $R_4$ are different and are either H or COOH; when $R_1$ and $R_2$ are both H, $R_3$ is COOH and $R_4$ is $CH_2COOH$; and when $R_1$ is $CH_3$, $R_2$ is COOH and $R_3$ and $R_4$ are different and are either H or COOH; and said second monomer forming compound is selected from the group consisting of 2-acrylamido-2-methylpropane sulfonic acid, sodium methally sulfonate, sodium p-vinyl benzene sulfonate, acrylamide, N,N-dimethylacrylamide, vinyl sulfonic acid, acrylonitrile, 1-vinyl-2-pyrrolidone, vinyl phosphonic acid, diallydimethylammonium chloride, diethylaminoethyl methacrylate, dimethylaminoethyl acrylate methyl chloride, methacrylamido propyltrimethyl ammonium chloride, N,N-dimethylaminoethyl methacrylate, and 2-triethylammoniummethyl methacrylate chloride.

10. The method of claim 9 wherein said first monomer forming compound is selected from the group consisting of maleic acid and itaconic acid.

11. The method of claim 10 wherein said second monomer forming compound is 2-acrylamido-2-methylpropane sulfonic acid.

* * * * *